July 2, 1957
E. V. WALSTON
2,797,495
GLASS BUILDING BLOCK ALIGNER
Filed Nov. 8, 1955
2 Sheets-Sheet 1
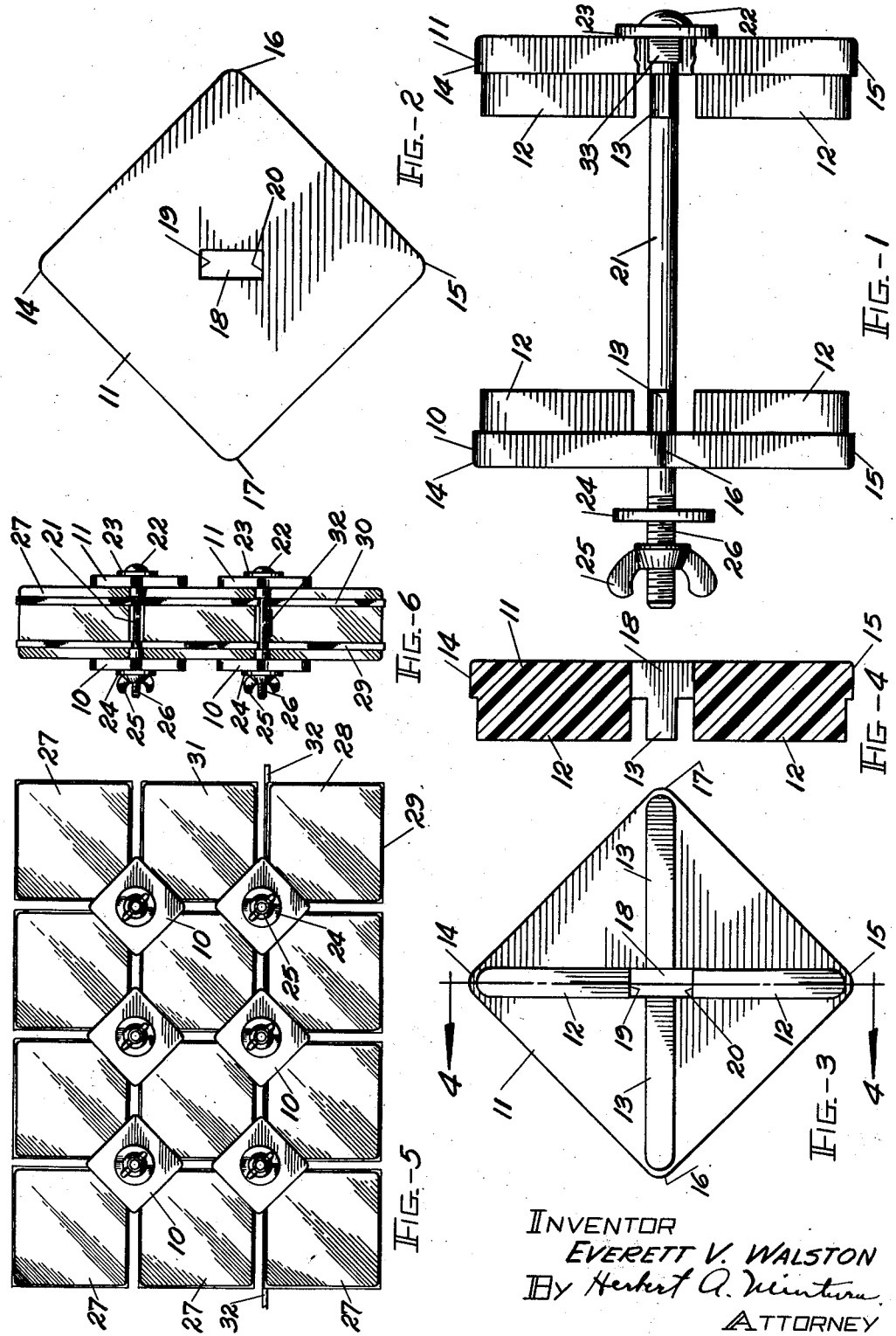
INVENTOR
EVERETT V. WALSTON
By Herbert A. Minturn
ATTORNEY July 2, 1957 E. V. WALSTON 2,797,495
GLASS BUILDING BLOCK ALIGNER
Filed Nov. 8, 1955 2 Sheets-Sheet 2
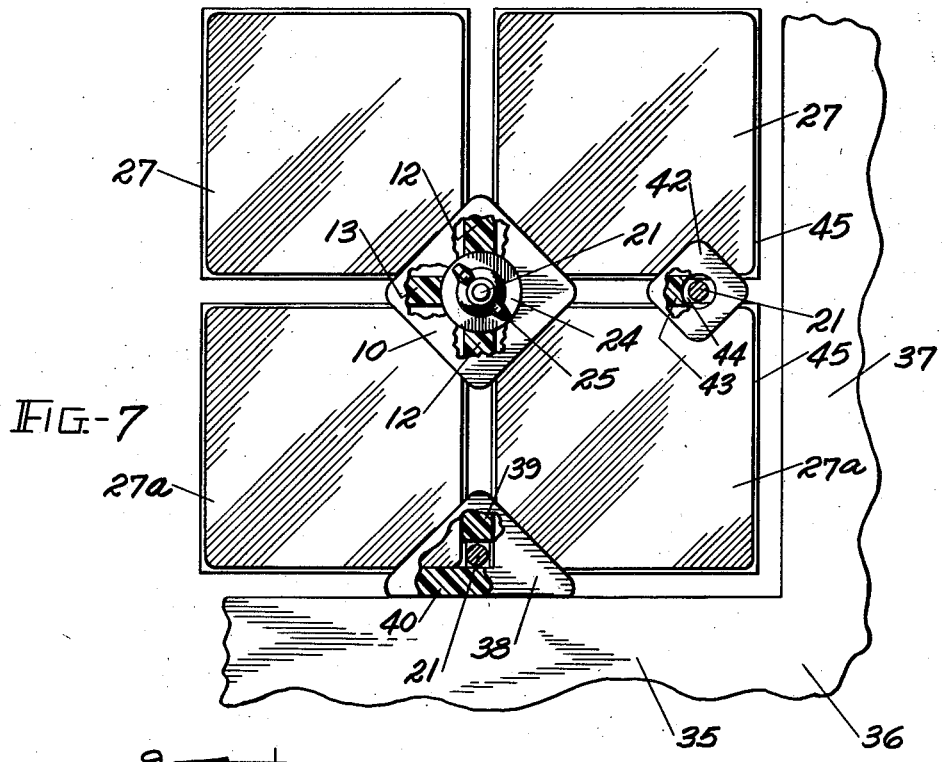
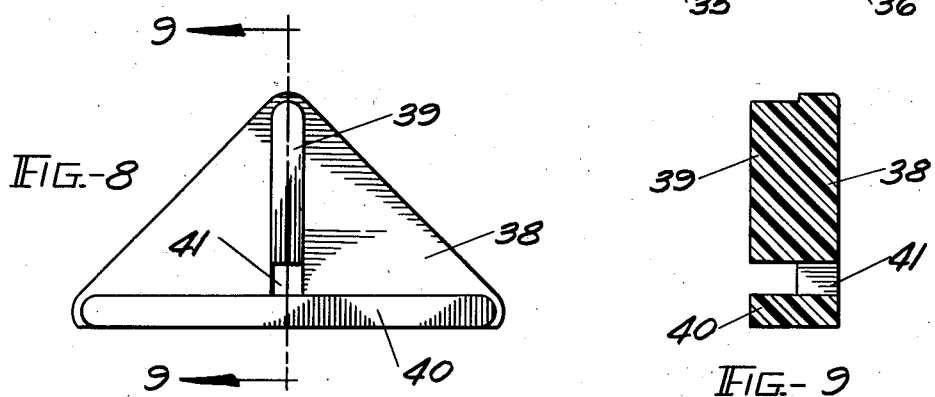
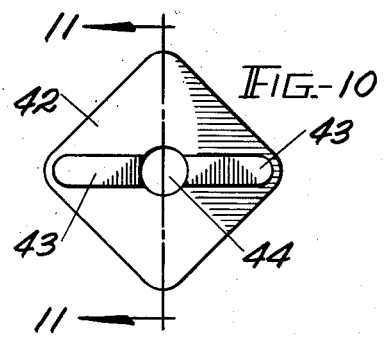
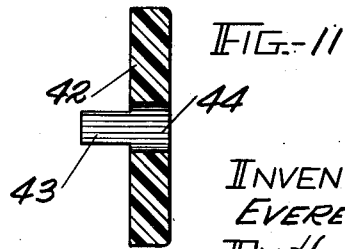
INVENTOR
EVERETT V. WALSTON
BY Herbert A. Venturu
ATTORNEY ns Patent Office 2,797,495
Patented July 2, 1957

2,797,495

GLASS BUILDING BLOCK ALIGNER

Everett V. Walston, Cicero, Ind.

Application November 8, 1955, Serial No. 545,766

2 Claims. (Cl. 33—180)

This invention relates to a device to be employed by masons in laying out glass building blocks. The device consists essentially of a pair of opposing plates having ribs entering between horizontal and vertical edges of adjacent blocks so as to space those blocks the proper distance for the cement or mortar joint and to retain that spacing until such cement or mortar sets. The pairs of plates are removable after the setting of that cement or mortar and are used only in the spacing vertically and horizontally of the blocks in the horizontal rows as well as vertical rows.

Glass building blocks have been looked upon with favor for certain wall construction particularly by architects who want to produce a certain lighting effect and yet have structural strength as well as translucent characteristics in the wall. However, the glass building blocks being made of glass have presented such difficulties in their laying into the wall that many masons object to laying them.

For example, one of the difficulties lies in the fact that even though these blocks are molded, they are generally made of two parts and then joined together after leaving the mold. The blocks in their final assembly in the form delivered to the job to be laid, do not run absolutely uniform and vary in dimensions, although small, yet sufficiently large to cause the masons quite a bit of difficulty in securing a straight and planar wall. These walls made of glass building blocks are normally laid to have horizontal rows thereof each spaced one above the other to have their vertical spacings in vertical alignment rather than in a staggered arrangement such as is commonly employed in laying up clay bricks and the like.

A primary object of the invention is to provide a device which will interengage building blocks by adjacent corners both inside and outside of the wall of the building blocks in adjacent vertical and horizontal rows whereby the blocks may be spaced vertically and horizontally apart the required distances so that the blocks may be initially tacked by mortar or cement and then after that material has set, the completed joints may be formed by flowing in the cement or mortar to complete the filled joints.

A further important object of the invention resides in the ease of employment of the device in laying of the wall and in the certainty of having every block properly aligned one in respect to the other in the wall. Furthermore, a primary object resides in the fact that the device may be used over and over again without any appreciable wear, and furthermore may be readily operated by hand without the necessity of employing any special tools or the like.

As above indicated the chief purpose of the device is to permit the mason to erect a wall of the glass building blocks so that the finished wall will be plumb and in horizontal alignment with the minimum effort and without the aggravation that has heretofore been encountered in trying to achieve that result where each block had to be laid and adjusted individually to achieve that end, which end was not always possible due to the irregularities of the blocks particularly along their edges.

These and many other objects and advantages of the invention will become more apparent in the following description of one particular form of the invention as illustrated in the accompanying drawings, in which Fig. 1 is a view of the device in side elevation;

Fig. 2 is an outside view in elevation of one of the two plates entering into the device;

Fig. 3 is an inside view in elevation of the plate;

Fig. 4 is a vertical section on the line 4—4 in Fig. 3;

Fig. 5 is a view in elevation of a portion of an assembled group of building blocks to which the invention is applied;

Fig. 6 is a view in end elevation of that assembly;

Fig. 7 is an elevational view in portional section of an assembly of glass blocks at the corner of a wall;

Fig. 8 is an inside elevational view of a bottom block spacer;

Fig. 9 is a view in vertical section on the line 9—9 in Fig. 8;

Fig. 10 is an inside elevational view of a block spacer at the end of rows of blocks; and Fig. 11 is a view in vertical section on the line 11—11 in Fig. 10.

The device comprises a pair of plates 10 and 11 each identical in form and dimensions. Each plate as indicated in Figs. 1 and 3 is provided with substantially rectangular ribs 12 and 13 each at right angles to the other and extending respectively from diagonally opposite corners 14, 15 in respect to the rib 12 and corners 16 and 17 in respect to the rib 13. These ribs 12 and 13 are interrupted at their central zone of intersection by a rectangular slot 18 of a width of the rib 12 and extending equal distances from the center point of the plate in the directions of the rib 12 to terminate by ends 19 and 20 removed respectively from the opposite sides of the rib 13. The ribs 12 and 13 are of equal transverse thicknesses and also extend equal distances outwardly from the face of the plate.

These plates 10 and 11 are used in pairs with the ribs 12, 13 of each disposed one toward the other and with a bolt 21 extending through the slot 18 of each plate. As indicated in Fig. 1, the bolt 21 is provided with a head 22 bearing against a washer 23 in turn bearing against the outer smooth face of the plate 11 and the bolt extends on through the plate 10 to carry a bearing washer 24 and a wing nut 25 on its screwthreaded end 26. By means of the wing nut 25, the plate 10 may be relatively advanced toward the plate 11 within certain restrictions. In using the device thus far described, building blocks generally designated by the numeral 27 are aligned in horizontal rows, such as in the initial lower row 28. These building blocks 27 are normally provided with ribs 29 and 30 spaced apart and extending entirely around the top side and bottom portions of the block. A second row of the blocks 31 is laid over the row 28 to be substantially in vertical alignment therewith. The assembly of the plates 10 and 11 and the bolt 21 as indicated in Fig. 1 is previously laid over the bottom row 28 before putting in position the blocks 27 of the row 31. In positioning the assembly, the plate 11 is placed on the rear side of the blocks in row 28 to have the lower portion of the rib 12 extending downwardly between the adjacent blocks in each instance with the rib 13 lying on the top sides of the two adjacent blocks. These ribs 12 and 13 extend from the plates 10 and 11 that distance which will clear by their outer faces the ribs 29 and 30. That is, the extension of the ribs 12 and 13 from the inner faces of the plates 10 and 11 is made to be slightly less than the distance from the face of the block 27 to rib nearest that face.

The bolt 21 is left between the plates 10 and 11, and the plate 10 carried thereby is positioned against the front faces of the blocks 27 at their vertical edges to in turn have the ribs 13 horizontally disposed across the top sides of the blocks and the lower portion of the rib 12 extending downwardly therebetween. Then as the blocks 27 in the row 31 are positioned, they will rest on the top sides of the ribs 13 and have the upper portions of the ribs 12 extend vertically upwardly therebetween. Following that alignment or arrangement, the thumb nut 25 is drawn up to compressibly engage the blocks 27 between the plates 10 and 11, that is cause the portions between the ribs to come into compressive contact with those blocks.

Thus the blocks are spaced vertically and horizontally by these ribs 12 and 13, and they are brought into vertical alignment by the plates 10 and 11 themselves. In positioning the plates 10 and 11 on the rows of blocks 27, the slots 18 are preferably vertically disposed so that the bolt 21 may be shifted within the length of slots vertically. This is desirable in order that the bolts 21 make clear a reenforcing tape or wire or rod as the case may be designated by the numeral 32 which may be carried horizontally between adjacent rows of the glass blocks 27 at regular intervals, such for example as between every third course for eight inch glass blocks and at every course between twelve inch glass blocks.

The plates 10 and 11 are preferably made out of a rubber-like material which may be slightly compressible, and yet sufficiently rigid to maintain its shape and apply the necessary compressive force to hold the glass blocks in alignment as above indicated. Other materials such as wood or the like may equally as well be employed.

It is to be noted however in respect to the choice of material, that it should be able to withstand normally corrosive or eroding effects of the cement or mortar which would be employed in the joints between blocks.

After the blocks 27 are laid one over the other and a sufficient amount of mortar or cement is employed to tack them into position to allow that tacking part to set, preferably over night or for such duration of time to permit the material to completely set and adhere firmly to the adjacent blocks. The tacking material however is limited in extent so as to leave the major portion of the spacings between the blocks open for subsequent filling. After this tacking material has dried, the assembly is removed from the wall by turning off the wing nut 25, pulling the bolt 21 outwardly, and then lifting off the two plates 10 and 11 so that the spacings between blocks are completely accessible for their filling. It is therefore to be seen that one of these assemblies of two of the plates and a bolt is required at each course vertically and horizontally between the corners of the four blocks in each instance.

The bolt 21 is in effect a carriage bolt having the shoulders 33 immediately under the head 22. These prevent normal turning of the bolt 21. Thus, when the nut 25 is turned on the bolt 21, the bolt 21 will be held against rotation.

Where the glass blocks 27 are to be laid over a horizontal section 35 of a wall 36 and adjacent a vertical section 37 such as would be occasioned in filling in a window-like opening in the wall 36, and particularly where the glass blocks are to be set inwardly from the face of the wall 36, modified forms of the plates 10 and 11 are employed at the marginal edges of the assembly of blocks.

For example, the lowermost row of blocks 27a are spaced above the horizontal portion 35 of the wall 36 by means of half plates 38, an inside view of which is illustrated in Fig. 8. In this half plate 38, there is retained the vertical rib 39 to enter between adjacent blocks 27a and there is the horizontal rib 40 upon which the blocks 27a rest, the vertical rib 39 being entered between the adjacent blocks as indicated so that these blocks are properly spaced apart not only one from the other but by the lower rib 40 are spaced a sufficient distance above the horizontal portion 35 of the wall 36 to permit the normal mortar joint to be made. The plate 38 has a hole 41 therethrough immediately over the lower rib 40, and this hole may be circular or rectangular as indicated in Fig. 8, there preferably being a sufficient size to this hole to permit the bolt 21 to be entered freely therethrough so that it may be shifted upwardly or horizontally as may be desired.

The usual plate 10 as previously described is employed at the upper ends of the blocks 27a and at intersection of courses throughout the assembly.

A plate 10 may be employed at the ends of the blocks 27a adjacent the vertical portion 37 of the wall 36, but a third type of spacer may be more readily usable. This third spacer or plate 42 is shown from an inside view in Fig. 10 and is provided with but one rib 43 thereacross interrupted by a center hole 44 through which the bolt 21 may be received. It is to be noted that there is but the one rib 43 and no rib at right angles thereto.

Thus by using the plate 42 at the ends of courses adjacent the vertical portion 37 of the wall 36, particularly where the spacing between the ends of the blocks may have to be varied to give a wider or more likely a narrower spacing than is the width of the normal course, the plate 42 may be brought between the lower block 27a and the upper block 27 and carried inwardly from the outer edges 45 of the blocks as indicated in Fig. 7, with the rib 43 spaced between the horizontal edges of those blocks.

The locating of the plate 42 between those two edges is not critical, and the plate 42 may be readily laid in spaced relation from the vertical portion 37 of the wall 36 without interference therebetween.

Therefore, it is to be seen that I have produced an exceedingly easily operable device simplified in form and durable in construction for the purpose indicated, and while I have described the device in the one particular form in minute detail, it is obvious that structural variations may be employed without departing from the spirit of the invention, and I therefore do not desire to be limited to that precise form beyond the limitations which may be imposed by the following claims.

I claim:

1. A device for aligning building blocks in a wall from both surfaces in non-staggered relation one with the other throughout the various superimposed courses, and wherein the mortar joints between the blocks extend in straight vertical and horizontal continuous lines throughout the wall, the vertical lines intersecting the horizontal lines, comprising a pair of plates; a vertical rib extending across opposing faces of the plates; a horizontal rib extending across the same faces of the plates at right angles to the vertical rib; each of said plates having a central opening therethrough at what would otherwise be an intersecting zone of the vertical and horizontal ribs; a bolt extending through both of said plates through said openings; one of said plates being positioned on each side of said wall and at each of adjacent corners of four of said blocks, two in one course and two in the next upper course, with the vertical ribs of the plates interposed between vertical edges of the blocks in both of said courses and the horizontal ribs interposed between the blocks in said two courses, said bolt extending across the corners of all four of said blocks and retaining said plates compressibly against the inner and outer face portions of the four blocks at said corners; and said horizontal ribs on the plates supporting the blocks in said upper course from both sides thereof.

2. The structure of claim 1 in which said plate central opening is elongated in the nature of a slot, and said plates are resilient to afford a degree of compressibility against said blocks under pull of said bolt.

References Cited in the file of this patent

UNITED STATES PATENTS

| | | |
|---|---|---|
| 915,982 | Maddux | Mar. 23, 1909 |
| 1,440,366 | Baldwin | Jan. 2, 1923 |
| 2,466,919 | Sykes | Apr. 17, 1949 |
| 2,543,716 | Carini | Feb. 27, 1951 |
| 2,543,717 | Carini | Feb. 27, 1951 |